(12) United States Patent
Stafford et al.

(10) Patent No.: US 10,761,454 B2
(45) Date of Patent: Sep. 1, 2020

(54) SYSTEM AND METHOD FOR DETERMINING TONER CARTRIDGE AUTHENTICITY VIA TONER PATTERNS

(71) Applicants: Kabushiki Kaisha Toshiba, Minato-ku (JP); Toshiba TEC Kabushiki Kaisha, Shinagawa-ku (JP)

(72) Inventors: Don W. Stafford, Lexington, KY (US); Michael W. Lawrence, Lexington, KY (US)

(73) Assignees: Kabushiki Kaisha Toshiba, Minato-ku (JP); Toshiba TEC Kabushiki Kaisha, Shinagawa-ku (JP)

(*) Notice: Subject to any disclaimer, the term of this patent is extended or adjusted under 35 U.S.C. 154(b) by 0 days.

(21) Appl. No.: 15/903,271

(22) Filed: Feb. 23, 2018

(65) Prior Publication Data

US 2019/0265611 A1   Aug. 29, 2019

(51) Int. Cl.
| | | |
|---|---|---|
| *G03G 15/08* | (2006.01) | |
| *G03G 9/09* | (2006.01) | |
| *G03G 15/00* | (2006.01) | |
| *G06F 3/12* | (2006.01) | |

(52) U.S. Cl.
CPC ....... *G03G 15/0855* (2013.01); *G03G 9/0926* (2013.01); *G03G 15/0863* (2013.01); *G03G 15/0865* (2013.01); *G03G 15/5041* (2013.01); *G03G 15/5058* (2013.01); *G03G 15/55* (2013.01); *G06F 3/1235* (2013.01); *G03G 2221/1823* (2013.01)

(58) Field of Classification Search
CPC .................................................. G03G 15/0855
USPC .............................................. 399/12–13, 27
See application file for complete search history.

(56) References Cited

U.S. PATENT DOCUMENTS

| | | | |
|---|---|---|---|
| 2005/0025506 A1* | 2/2005 | Adachi | G03G 21/1889 399/27 |
| 2007/0200908 A1* | 8/2007 | Kin | G03G 15/0131 347/140 |

FOREIGN PATENT DOCUMENTS

| | | | | |
|---|---|---|---|---|
| JP | 2006047366 A | * | 2/2006 | |
| JP | 2012053361 A | * | 3/2012 | |
| JP | 2015099260 A | * | 5/2015 | G03G 21/14 |

* cited by examiner

*Primary Examiner* — Quana Grainger
(74) *Attorney, Agent, or Firm* — Ulmer & Berne LLP

(57) ABSTRACT

A system and method for determining print cartridge authenticity in a printer includes an electrostatic process unit with a photoconductive drum configured to selectively generate a toner pattern from an associated toner cartridge based at least in part on electronic data associated with the toner cartridge. A transfer belt receives the toner pattern from the photoconductive drum and a sensor sensing the toner pattern on the transfer belt. A processor compares the toner pattern with a sensed toner pattern and generates an error condition when the toner pattern does not substantially match the sensed toner pattern. The toner includes an infrared reflective additive or an ultraviolet fluorescing additive and the sensor is configured to sense in the infrared or ultraviolet frequencies. The processor is configured to generate an error condition when the additive is not sensed by the sensor.

15 Claims, 5 Drawing Sheets

SYSTEM AND METHOD FOR DETERMINING TONER CARTRIDGE AUTHENTICITY VIA TONER PATTERNS

TECHNICAL FIELD

This application relates generally to authenticating toner cartridges in toner-based printers, and more particularly to using image quality sensors to authenticate toner cartridges based on patterns of toner on transfer belts.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFP means any of the forgoing.

Toner used for printing on the MFP is a consumable that comes in replaceable toner cartridges from the MFP manufacturer. These replacement toner cartridges are often called original equipment manufacturer (OEM) cartridges. MFP manufacturers discourage the use of third party toner cartridges and toner. The use of third party toner cartridges and toner, or third party refurbished toner cartridges in an MFP can impact performance of the MFP or increase maintenance requirement depending upon the quality of the toner cartridge and toner. Inferior toner can require changes to EPU parameters by service representatives or users to obtain satisfactory prints. Users may attribute inferior performance of the MFP to the manufacturer, which can damage the reputation of the manufacturer, especially if the cartridge is a counterfeit cartridge that users identify with the manufacturer.

It is therefore desirable for MFP manufacturers to be able to detect if an unauthorized replacement toner cartridge has been inserted into an MFP. Various attempts to limit third party toner cartridge use in printers range from mechanical interactions, electrical sensors, microchips encoded with information to determine authenticity and so forth. However, third parties often find ways to circumvent such security measures, for example by duplicating codes and cartridge mechanisms, re-using parts from OEM cartridges, or otherwise defeating security measures.

BRIEF DESCRIPTION OF THE DRAWINGS

Various embodiments will become better understood with regard to the following description, appended claims and accompanying drawings wherein:

SUMMARY

A system and method for determining print cartridge authenticity in a printer includes an electrostatic process unit with a photoconductive drum configured to selectively generate a toner pattern from an associated toner cartridge based at least in part on electronic data associated with the toner cartridge. A transfer belt receives the toner pattern from the photoconductive drum and a sensor senses the toner pattern on the transfer belt. A processor compares the toner pattern with a sensed toner pattern and generates an error condition when the toner pattern does not substantially match the sensed toner pattern.

In accordance with another aspect of the subject application, the toner cartridge includes an infrared reflective additive or an ultraviolet fluorescing additive and the sensor is configured to sense in the infrared or ultraviolet frequencies. The processor is configured to generate an error condition when the additive is not sensed by the sensor.

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In toner-based electro-photographic printers, toner is picked up by a magnetic developer roller in an electrostatic process unit, or EPU, from a toner hopper. The magnetic developer roller rotates towards a photoconductive drum onto which an electric charge has been applied in accordance with a desired image to be printed, and toner from the magnetic developer roller is selectively transferred to the photoconductive drum. The toner is then transferred from the photoconductive drum to paper via a transfer belt and fused with the paper to form a printed page. Transfer belts are part of a removable unit called a transfer belt unit (TBU) that can include the transfer belt and transfer rollers.

In black and white printers, a single photoconductive drum is used, while in color printers four or more photoconductive drums are used. Each photoconductive drum successively places toner of a particular color, such as yellow, magenta, cyan, or black, onto the transfer belt in accordance with the image to be printed. After the transfer belt has passed each photoconductive drum, the transfer belt has the entire image to be printer which is then transferred to the paper and fused to the paper by heat.

Figure 1:
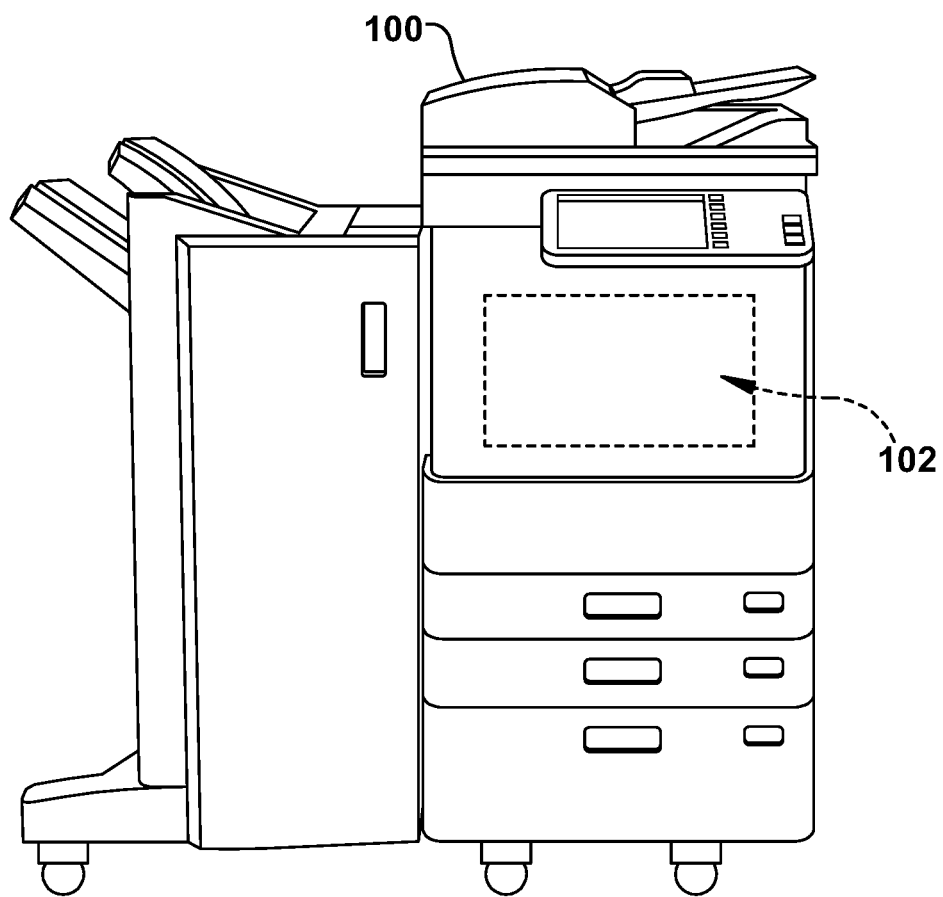
FIG. 1 is a diagram of a multifunction peripheral.

With reference to FIG. 1, an example multifunction peripheral (MFP 100) is presented. The MFP 100 includes electrostatic-based, or toner-based, printing hardware 102 for performing printing operations. The hardware 102 includes electrostatic process units and a transfer belt unit as would be understood in the art.

Figure 2:
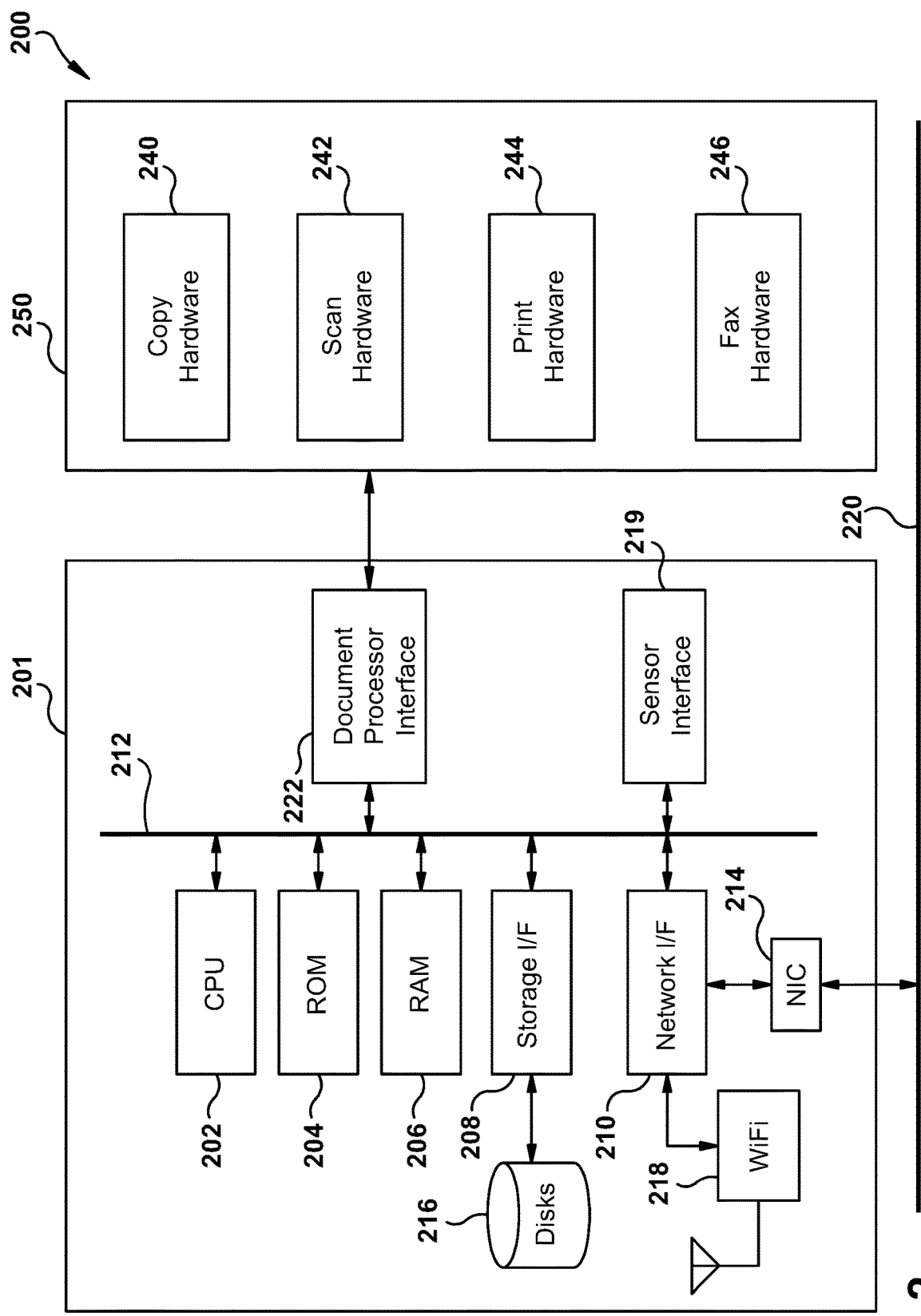
FIG. 2 is a block diagram of components of a document rendering system.

With reference to FIG. 2, an example document rendering system 200 is presented. The document rendering system 200 includes electrostatic-based, or toner-based, printing hardware 102 for performing printing operations as would be understood in the art. Illustrated is an example embodiment of a document rendering system 200 suitably comprised within an MFP, such as MFP 200 of FIG. 1. Included is intelligent controller 201 comprised of one or more processors, such as that illustrated by processor 202. Each processor is suitably associated with non-volatile memory such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Apple Lightning, telephone line, or the like.

Processor 202 can also be in data communication with any suitable user input/output (I/O) interface which provides data communication with user peripherals, such as displays, keyboards, mice, track balls, touch screens, or the like. Hardware monitors suitably provides device event data, working in concert with suitable monitoring systems, for example monitoring subroutines executed by the processor 202. By way of further example, monitoring systems may include page counters, sensor output, such as consumable level sensors, temperature sensors, power quality sensors, device error sensors, door open sensors, and the like. Sensor data can be obtained from the sensors via a sensor interface 219. Data is suitably stored in one or more device logs, such as in storage 216.

Also in data communication with data bus 212 is a document processor interface 222 suitable for data communication with MFP functional units. In the illustrated example, these units include copy hardware 240, scan hardware 142, print hardware 244 and fax hardware 246 which together comprise MFP functional hardware 250. It will be understood that functional units are suitably comprised of intelligent units, including any suitable hardware or software platform.

Figure 3:
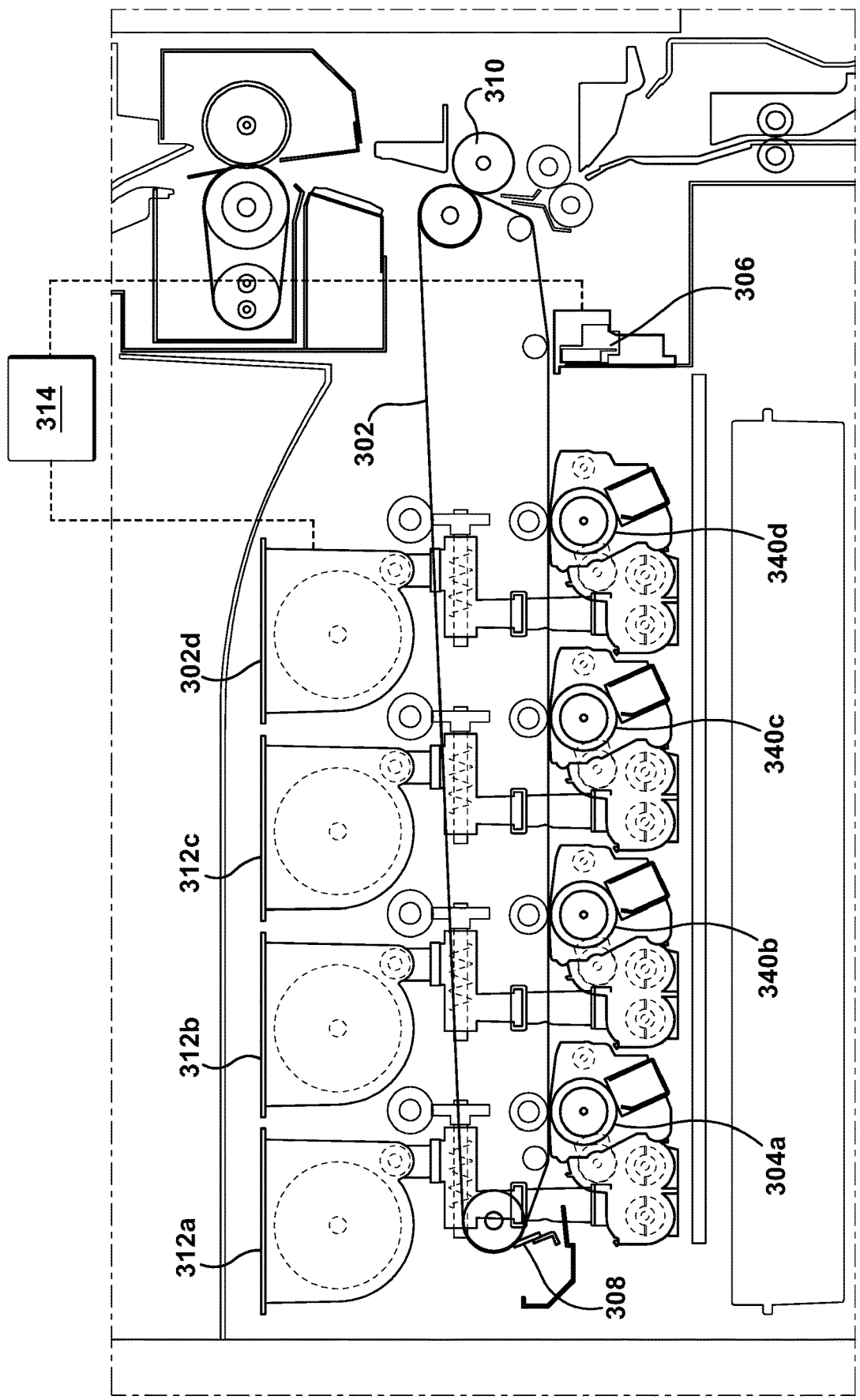
FIG. 3 is a diagram of print hardware of a multifunction peripheral.

With reference to FIG. 3, example print hardware 300 of a color MFP is illustrated. The print hardware 300 includes a transfer belt 302, a transfer belt cleaning blade 308, and associated rollers of a transfer belt unit (TBU). The print hardware 300 also includes toner cartridges 312a, 312b, 312c, 312d (collectively toner cartridges) or toner hoppers, a toner transfer roller 310, image quality control sensors 306, and photoconductive drums 304a, 304b, 304c, 304d (collectively photoconductive drums 304) of associated electrostatic print units (EPUs). In black and white printers, a single photoconductive drum 304 is used, while in color printers four or more photoconductive drums 304 are used.

Control of print jobs is managed by an intelligent controller 314. During a typical print job, toner from an associated toner cartridge 312 is selectively attracted onto one or more photoconductive drums 304 in electrostatic process units (EPU) in accordance with an image to be printed. The toner is then transferred from each of the photoconductive drums 304 onto the transfer belt 302. The toner is next transferred from the transfer belt 302 to paper via the transfer roller 310, after which the toner is fused by heat onto the paper and the printed page is delivered to a tray for retrieval by a user.

However, MFPs can also transfer toner to the transfer belt 302 without also transferring the toner to the paper. For example, the intelligent controller 314 of a color MFP may execute color registration control operations whereby the intelligent controller 314 prints one or more test patterns onto the transfer belt 302 for testing the print quality. During the test, each photoconductive drum 304 successively places toner of a particular color, such as yellow, magenta, cyan, or black, onto the transfer belt 302 in accordance with the test pattern. Image quality sensors 306 of an associated image quality control unit sense the toner on the transfer belt 302. The intelligent controller 314 compares the toner pattern sensed by the image quality sensors 306 to the intended test pattern. Based on the result of the comparison, the intelligent controller 314 makes appropriate corrections to other parts of the print engine, such as the laser units, to improve the quality of future print jobs. The transport belt 302 continues to loop past the transfer roller 310, which is maintained in an uncharged state so as to prevent toner transfer from the transfer belt 302. The toner on the transfer belt 302 is ultimately removed by a transfer belt cleaning blade 308 as the transfer belt 302 continues to loop around. A user of the MFP may be unaware that these operations are being performed as generally no paper is printed.

Figure 4:
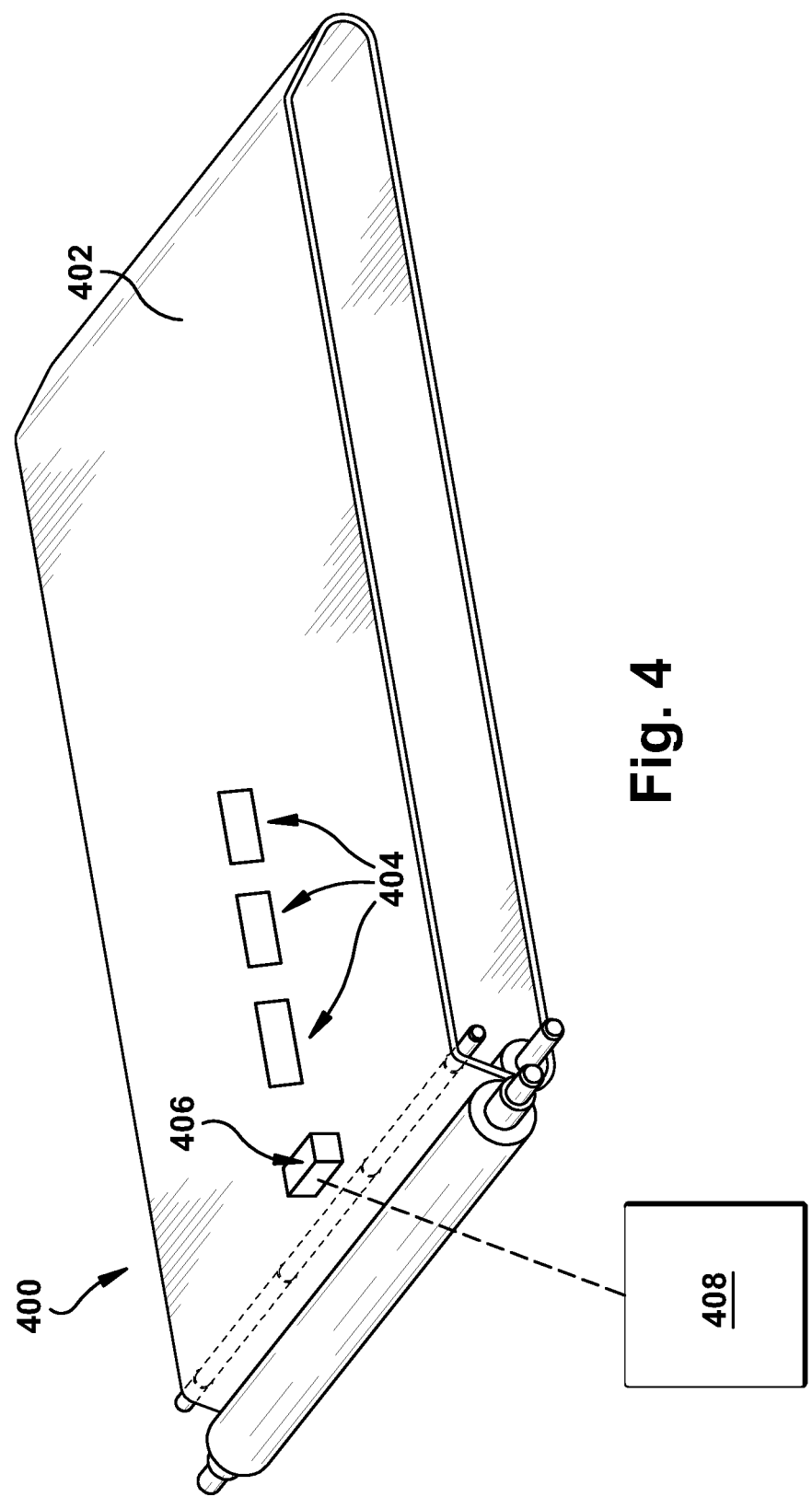
FIG. 4 is a functional diagram of an embodiment of a toner authentication system of a multifunction peripheral.

With reference to FIG. 4, a functional diagram of a toner authentication system 400 is illustrated. When a toner cartridge is loaded into the MFP, the MFP prints a toner pattern 404 on the transfer belt 402. A toner authenticity sensor 406 reads the toner pattern 404, and an associated processor 408 determines whether the toner pattern 404 matches the intended pattern. In an embodiment, the processor 408 is the intelligent controller of the MFP, for example intelligent controller 201 of FIG. 2.

In an embodiment, the toner authenticity sensor 406 is an existing image quality control sensor, for example one of the image quality control sensors 306 of FIG. 3 such as a toner density sensor. In an embodiment, the toner can include an additive and the toner authenticity sensor 406 can be configured to sense the additive. For example, the toner authenticity sensor 406 can be configured to sense in the infrared (IR) or ultraviolet (UV) wavelengths and the additive can be an IR reflective additive or a UV fluorescent additive. In an embodiment, each toner cartridge can include one or more additives. For example, different colors of toner can include different additives. In an embodiment, one or more toner authenticity sensors 406 and the image quality control sensor can be used together to detect authenticity.

In an embodiment, the toner cartridge can include a chip that includes electronic data such as a random code or a rolling code, and the toner pattern 404 that is printed on the transfer belt 402 and read by the toner authenticity sensor 406 can represent the electronic data or code. In an embodiment, the electronic data used to generate the toner pattern 404 can be retrieved directly from the toner cartridge by an EPU associated with the toner cartridge or any other suitable hardware in the MFP. In an embodiment, the code in the chip can be updated by the processor based on the number of pages printed on the MFP or any other suitable metric correlating to use. In this configuration, when the toner authenticity sensor 406 reads the code, the processor 408 can determine if an existing cartridge has been refilled. In a configuration, the code can be used to present information about the toner in the toner cartridge to the MFP for adjusting any necessary EPU or MFP parameters to improve print quality, which would allow parameter changes to be made by the MFP without requiring customer or service rep intervention.

In an embodiment, the code and toner additives can be used in concert to provide a two factor toner authentication method. For example, if third parties manage to circumvent the code used for authentication, the toner pattern 404 generated from a counterfeit cartridge may physically match the expected code. But if the toner authenticity sensor 406 does not detect the additive in the third party toner then the processor 408 can trigger a response action, such as an error code, an alert message sent over a network, or a fault condition that prevents the MFP from printing. In an embodiment, the additives can be periodically updated or changed, either to provide an approximate time stamp for the toner, or to help detect if third parties have modified their toner to defeat the two factor toner authentication system 400.

Figure 5:
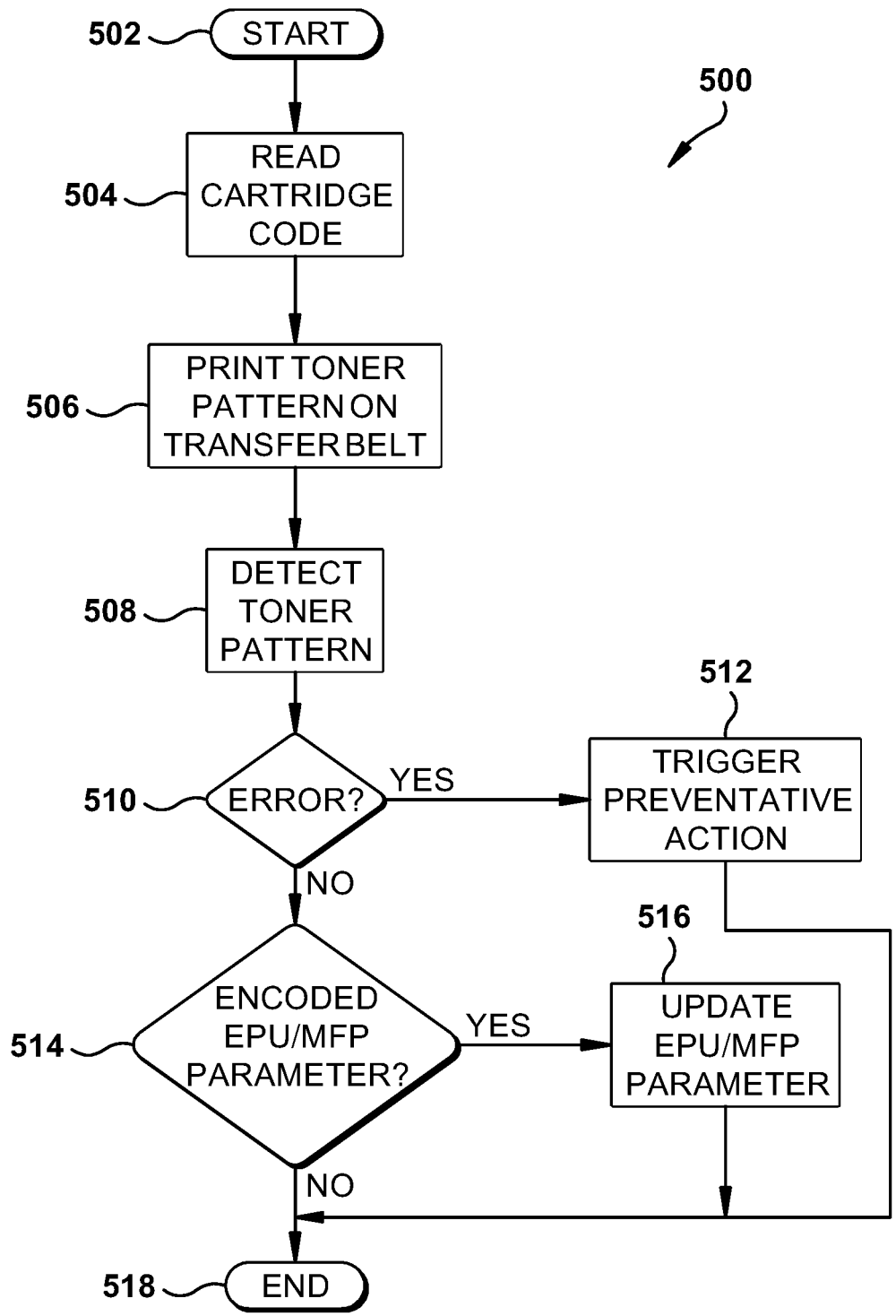
FIG. 5 is a flowchart of an embodiment of a system for authenticating toner cartridges.

Referring now to FIG. 5, a flowchart 500 of example operations for an embodiment of a toner authentication system are illustrated. Operation begins at start block 502, for example when a new toner cartridge is detected, and optionally proceeds to block 504 or block 506. At optional block 504, a cartridge code is read by the system, for example by interrogating a chip in the toner cartridge and receiving data from the chip as described above for FIG. 4. Processing continues to block 506.

At block 506, a toner pattern is printed onto the transfer belt by one or more of the EPUs, for example the EPU associated with the new toner cartridge. In a configuration, the toner pattern can be an encoded pattern, for example a one or two dimensional barcode representation of the cartridge code or data derived using the cartridge code. In another configuration, the toner pattern can be a standard test pattern used for print quality testing. Processing continues to block 508.

At block 508, a sensor detects the toner pattern and transmits sensor data to a processor, such as the intelligent controller of the MFP. In a configuration, the sensor can be an existing sensor, such as an image quality sensor that detects toner density. In another configuration, the sensor can be a sensor that operates in the UV or IR frequencies if UV fluorescing or IR reflecting additives have been added to the toner for authentication purposes. Processing continues to block 510.

At decision block 510, the processor determines if an error condition has occurred. For example, the error could be a mismatch between the toner pattern and the expect toner pattern. In another example, the toner pattern can be encoded with information about the number of pages printed using the cartridge and the number of pages could be outside the expected range indicating that the toner cartridge had been refilled by a third party. In another example, the error can be based on the sensor not detecting the appropriate additive in the toner.

If the processor determines that an error condition has occurred, the processing proceeds to block 512 and a preventative action is triggered. Example preventative actions can include, but are not limited to, sending an error message to the MFP front panel, signaling an appropriate error code to service professionals, and halting operation of the MFP among other suitable preventative actions. Processing then terminates at end block 518.

If no error condition is detected, for example if the printed toner pattern matches the expected toner pattern or the sensor detects the appropriate additive, then processing proceeds to block 514.

At decision block 514, if the toner pattern include encoded information about settings or parameters to be used by the EPU or other part of the MFP, for example parameters to be used to enhance print quality based on the toner in the cartridge, then processing proceeds to block 516 to update the appropriate parameters and the process terminates at block 518. Otherwise the process terminates at block 518 without updating operating parameters.

In light of the foregoing, it should be appreciated that the present disclosure significantly advances the art of transfer belt units for toner-based printers. While example embodiments of the disclosure have been disclosed in detail herein, it should be appreciated that the disclosure is not limited thereto or thereby inasmuch as variations on the disclosure herein will be readily appreciated by those of ordinary skill in the art. The scope of the application shall be appreciated from the claims that follow.

What is claimed is:

1. An apparatus, comprising:
an electrostatic process unit that includes a photoconductive drum configured to selectively generate, via a sensor, sensor data correlating with a sensed toner pattern of an associated toner cartridge based at least in part on electronic data associated with the toner cartridge;
a transfer unit configured to receive the toner pattern from the photoconductive drum;
a sensor configured to generate sensed pattern data from the toner pattern on the transfer unit; and
a processor associated with the electrostatic process unit and configured to
compare the sensed pattern data with the sensor data to generate comparison data, and
generate an error condition when the toner pattern does not substantially match the sensed toner pattern as indicated by the comparison data.

2. The apparatus of claim 1, wherein the processor is a processor of an intelligent controller of a multifunction peripheral.

3. The apparatus of claim 2, wherein the sensor is an image quality sensor of the multifunction peripheral.

4. The apparatus of claim 1, further comprising:
a toner cartridge associated with the electrostatic process unit that includes the toner which includes one or more of an IR reflective additive or a UV fluorescing additive.

5. The apparatus of claim 4, wherein the sensor is configured to sense one or more of an IR frequency or a UV frequency.

6. The apparatus of claim 1, wherein the processor is further configured to sense when the toner cartridge is replaced.

7. The apparatus of claim 1, wherein the processor is further configured to:
interrogate a chip associated with the toner cartridge,
receive the electronic data from the chip responsive to interrogating, and
generate the toner pattern which is derived at least in part from the electronic data received from the chip.

8. An apparatus comprising:
an electrostatic process unit that includes a photoconductive drum configured to selectively generate a toner pattern data corresponding to a toner pattern of an associated toner cartridge based at least in part on electronic data associated with the toner cartridge;
a transfer unit configured to receive the toner pattern from the photoconductive drum; and
a sensor configured to generate sensor data correlating with a sensed toner pattern on the transfer unit;
a processor configured to compare the sensor data against data correlating with the toner pattern data to generate comparison data;

wherein the processor is further configured to generate an fault condition in accordance with the comparison data when the sensed toner pattern does not substantially match the toner pattern; and wherein the processor is further configured to perform a preventative action including one or more of
sending an error message to a display of the apparatus, or
transmitting an error code for servicing the apparatus.

9. The apparatus peripheral of claim 1, wherein the processor is further configured to decode an encoded parameter from the sensed toner pattern and set an operating parameter of an associated multifunction peripheral based on the parameter.

10. A multifunction peripheral, comprising:
at least one electrostatic process unit that includes a photoconductive drum configured to selectively generate a pattern of toner;
a toner cartridge configured to provide toner that includes an additive to an associated electrostatic process unit;
a transfer belt unit including a transfer belt configured to receive the pattern of toner from the photoconductive drum;
a sensor configured to attempt to sense the presence of the additive in the pattern of toner on the transfer belt;
a processor configured to decode an encoded parameter in the pattern of toner and set an operating parameter of an associated multifunction peripheral based on the parameter, wherein the processor is further configured to generate an error condition when the sensor does not sense the additive in the pattern of toner.

11. A method, comprising:
transferring a toner pattern from a photoconductive drum of an electrostatic process unit to a transfer belt;
generating, by a sensor, sensor data correlating with a sensed toner pattern;
comparing, by a processor, the sensor data against data toner pattern data associated with the toner pattern;
generating, by the processor, an error condition when the sensed toner pattern does not substantially match the toner pattern as indicated by a comparison of the sensor data with the toner pattern data.

12. The method of claim 11, further comprising:
sensing, by the processor, a new toner cartridge associated with the electrostatic process unit prior to performing the operation of transferring the toner pattern to the transfer belt.

13. The method of claim 12, further comprising:
interrogating, by the processor, a chip associated with the new toner cartridge;
receiving, by the processor, data from the chip; and
generating the toner pattern which is derived at least in part from the data received from the chip.

14. The method of claim 11, further comprising:
triggering, by the processor, a preventative action including one or more of
sending an error message to a display of an associated multifunction peripheral,
transmitting an error code for servicing the multifunction peripheral, or
generating a fault condition for the multifunction peripheral.

15. The method of claim 11, further comprising:
decoding, by the processor, an encoded parameter from the sensor data; and
setting an operating parameter of an associated multifunction peripheral based on the parameter.

* * * * *